(12) United States Patent
Mohammed et al.

(10) Patent No.: US 6,990,508 B1
(45) Date of Patent: Jan. 24, 2006

(54) HIGH PERFORMANCE CARRY CHAIN WITH REDUCED MACROCELL LOGIC AND FAST CARRY LOOKAHEAD

(75) Inventors: Haneef D. Mohammed, Beaverton, OR (US); Rochan Sankar, San Jose, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 554 days.

(21) Appl. No.: 09/951,684

(22) Filed: Sep. 11, 2001

(51) Int. Cl.
  *G06F 7/50* (2006.01)
(52) U.S. Cl. ............... 708/700; 708/707; 708/710
(58) Field of Classification Search ........ 708/700–714, 708/230
  See application file for complete search history.

(56) References Cited

U.S. PATENT DOCUMENTS

| | | | |
|---|---|---|---|
| 3,925,652 A | | 12/1975 | Miller |
| 4,323,981 A | | 4/1982 | Nakamura |
| 4,584,661 A | | 4/1986 | Grundland |
| 4,761,760 A | | 8/1988 | Tomoji |
| 5,084,835 A | * | 1/1992 | Okamoto .................. 708/710 |
| 5,434,810 A | * | 7/1995 | Goto et al. ............... 708/710 |
| 5,481,206 A | * | 1/1996 | New et al. ............... 708/707 |
| 5,701,504 A | * | 12/1997 | Timko .................. 708/710 |
| 5,898,602 A | * | 4/1999 | Rothman et al. .......... 708/230 |
| 6,012,079 A | * | 1/2000 | Song .................. 708/710 |
| 6,034,546 A | | 3/2000 | Jones et al. |
| 6,188,240 B1 | * | 2/2001 | Nakaya .................. 708/710 |
| 6,201,409 B1 | | 3/2001 | Jones et al. |
| 6,269,386 B1 | * | 7/2001 | Siers et al. ............ 708/710 |
| 6,708,190 B1 | * | 3/2004 | Jones et al. ............ 708/230 |
| 2001/0037349 A1 | * | 11/2001 | Hayakawa .............. 708/710 |

OTHER PUBLICATIONS

Chang et al., Carry-select adder using single ripple-carry adder, Oct. 29th 1998, IEEE, vol. 34 No. 22 pp. 2101-2103.*
Roger Bettman et al., "Reduced Product Term Carry Chain", U.S. Appl. No. 09/587,708, filed Jun. 5, 2000.

* cited by examiner

Primary Examiner—Kakli Chaki
Assistant Examiner—Chat C. Do
(74) *Attorney, Agent, or Firm*—Christopher P. Maiorana, PC

(57) ABSTRACT

A programmable logic block in an integrated circuit comprising a plurality of macrocells, an AND-array, an OR-array, and a logic circuit. The plurality of macrocells may comprise logic that may be configured to (i) generate and propagate an inverted carry-input signal and (ii) generate a sum bit. The AND-array may comprise at least two product terms per macrocell. The OR-array may be configured to generate a sum-of-products term for each macrocell in response to the two product terms. The logic circuit may be configured to (a) receive (i) the product terms and (ii) the carry-input signal generated by a first macrocell of the plurality of macrocells and (b) generate (i) a block carry-propagate signal, (ii) a block carry-generate signal, and (iii) a block carry-output signal.

17 Claims, 8 Drawing Sheets

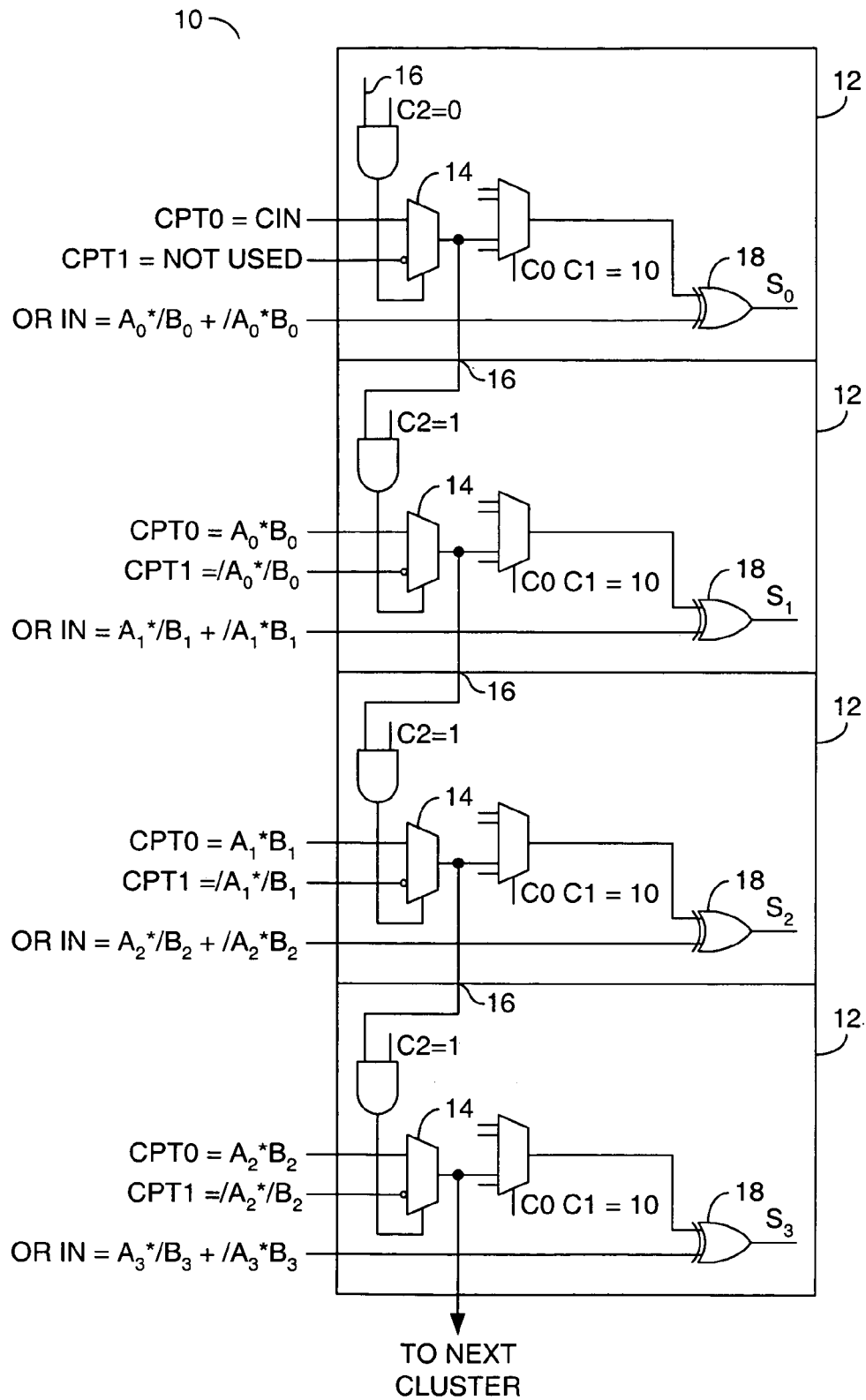
(CONVENTIONAL)
FIG. 1

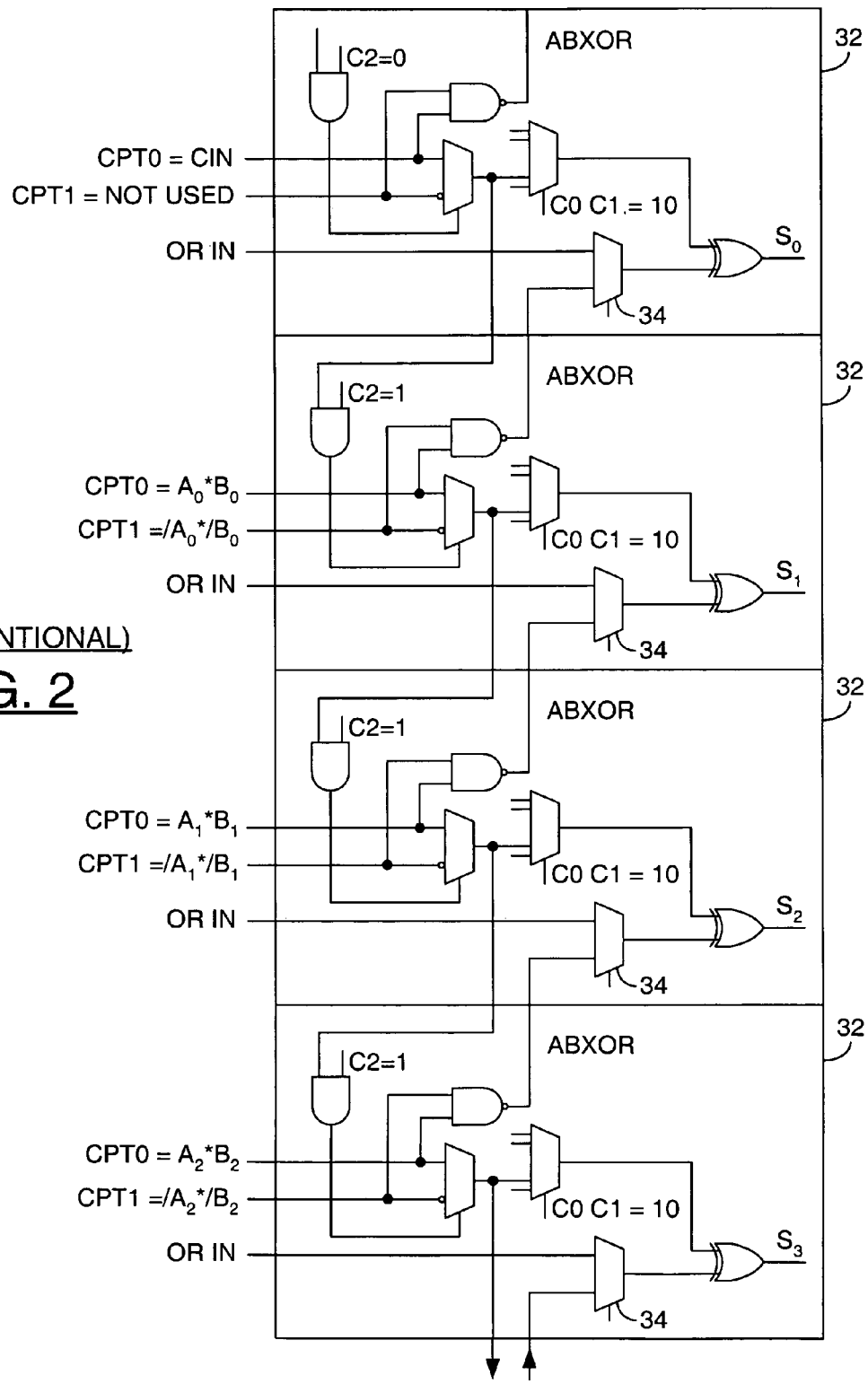
(CONVENTIONAL)
FIG. 2

HIGH PERFORMANCE CARRY CHAIN WITH REDUCED MACROCELL LOGIC AND FAST CARRY LOOKAHEAD

CROSS-REFERENCE TO RELATED APPLICATIONS

The present invention may relate to co-pending application U.S. Ser. No. 09/951,685, filed Sep. 11, 2001, which is hereby incorporated by reference in its entirety.

FIELD OF THE INVENTION

The present invention relates to a method and/or architecture for computing a sum or difference and carry-out of numbers in a programmable logic circuit generally and, more particularly, to a method and/or architecture for a high performance carry chain with reduced macrocell logic and fast carry lookahead.

BACKGROUND OF THE INVENTION

Arithmetic functions such as adders, subtractors, and magnitude comparators appear in datapath circuits targeted to programmable logic devices (PLDs). The arithmetic functions are typically the critical delay path of a design. As a result, a carry chain can be a vital part of the PLD logic fabric. Optimizing the carry chain can improve performance.

Product-term carry chain architectures have employed a basic ripple-chain structure to propagate the carry term across individual macrocells and logic blocks. In a ripple-carry adder implementation, the worst-case delay is from the carry-in of the least significant bit to the carry-out of the most significant bit. The worst case delay grows linearly with increasing adder width.

Referring to FIG. 1, a product-term based carry chain scheme 10 described in U.S. Pat. No. 6,201,409 is shown. Each segment 12 of the carry chain 10 has inputs that receive two product terms from a product-term array (CPT0, CPT1), a 2:1 carry chain multiplexer 14 with one inverting input and one non-inverting input, and a carry select input 16. The CPT0 and CPT1 inputs are connected directly to two product terms and do not come from the product-term matrix (PTM, not shown). However, the product terms presented to the inputs CPT0 and CPT1 are also inputs to the PTM and can be used to form sum-of-products logic equations. The carry chain multiplexer 14 acts as a single-bit carry generator, selecting one of the two product terms as the carry-in to the particular segment (macrocell) 12. Each segment 12 generates the sum output via an XOR gate 18.

The output of each carry chain multiplexer 14 is propagated as the carry-out to the next macrocell in the chain. The carry-out to the next macrocell is ANDed with a configuration bit, allowing each segment of the carry chain to be decoupled from the next. The single-bit carry generation and propagation is repeated until the carry reaches the last macrocell in the current logic block, at which point the carry-out ripples to the carry-in of the first macrocell in the next logic block.

The carry chain 10 can have a long ripple delay from carry-in to carry-out. The critical path delay increases linearly with the bit width, such that a sizeable arithmetic function can considerably slow down an entire design. For instance, in a current programmable logic device, a 64-bit addition mapped to the carry chain of FIG. 1 can have a worst-case Cin-to-Cout delay of 14.755 ns. For the carry signal to propagate in a single clock cycle, the user's design would have to operate at less than 67 MHz.

Each segment of the carry chain 10 consumes 4 unique product terms per macrocell: 2 carry chain product terms (CPT0, CPT1) and 2 product terms from the PTM to form the partial sum (AB'+ A'B). The carry chain scheme 10 necessitates a PLD architecture that allocates at least 4 unique product terms per macrocell.

However, the overall area and delay performance of a high-density PLD can be optimized when the logic clusters are small and allocate only 2 to 3 product terms per macrocell.

Referring to FIG. 2, a reduced product-term carry chain 30 is shown. A description of the carry chain 30 may be found in the co-pending application U.S. Ser. No. 09/587,780, which is hereby incorporated by reference in its entirety. The carry chain 30 has a ripple-chain structure across macrocells and logic blocks similar to the chain 10 of FIG. 1. However, logic is added to each macrocell 32 to generate the sum output directly from the product terms CPT0 and CPT1. Instead of consuming 2 additional product terms from the AND-OR plane to generate a partial sum, the product terms CPT0 and CPT1 are combined by a NOR gate 38 to provide the same partial sum. A 2:1 multiplexer 34 controlled by a configuration bit determines whether the partial sum or the regular sum-of-products equation from the AND-OR plane (OR-in) is driven to the XOR gate 36. The carry chain 30 can be fully implemented in a logic block that allocates as few as 2 product terms per macrocell.

The carry chain 30 can have a long propagation delay associated with the ripple-carry path from block to block. The critical path performance of the carry chain 30 can be similar to that of the carry chain 10. Because the reduced product term scheme 30 introduces an additional NOR gate, multiplexer, and configuration bit to every macrocell in the device, the complexity of the macrocell and configuration architecture is increased. Also, the presence of the multiplexer 34 can increase the propagation delay through the normal sum-of-products data path.

SUMMARY OF THE INVENTION

The present invention concerns a programmable logic block in an integrated circuit comprising a plurality of macrocells, an AND-array, an OR-array, and a logic circuit. The plurality of macrocells may comprise logic that may be configured to (i) generate and propagate an inverted carry-input signal and (ii) generate a sum bit. The AND-array may comprise at least two product terms per macrocell. The OR-array may be configured to generate a sum-of-products term for each macrocell in response to the two product terms. The logic circuit may be configured to (a) receive (i) the product terms and (ii) the carry-input signal generated by a first macrocell of the plurality of macrocells and (b) generate (i) a block carry-propagate signal, (ii) a block carry-generate signal, and (iii) a block carry-output signal.

The objects, features and advantages of the present invention include providing a high performance carry chain with reduced macrocell logic and fast carry lookahead that may (i) reduce the number of product terms for implementing sum and carry logic from 4 to 2 per macrocell, ignoring constants, (ii) allow greater flexibility in defining the number of product terms per macrocell in a PLD logic cluster, (iii) achieve better overall area and delay performance for a PLD, (iv) achieve a reduction in product term consumption without introducing additional logic or configuration elements into the macrocell architecture, (v) reduce area and bitstream complexity, (vi) reduce the delay in the macrocell datapath compared to existing carry chain schemes, (vii) decrease the delay in the critical path when implementing any generic logic function, (viii) provide very fast and flexible implementations of arithmetic functions, particularly when the function is very wide, (ix) achieve a worst-case delay of order $\log_m N$, where m=number of segments in a cluster and N=bit width of the function, (x) implement faster adder circuits using a multi-bit ripple mode instead of single-bit ripple mode, (xi) provide much faster adder circuits using a multi-level carry-lookahead implementation, and/or (xii) provide much faster adder circuits using a carry-select implementation of multi-bit ripple chains.

BRIEF DESCRIPTION OF THE DRAWINGS

These and other objects, features and advantages of the present invention will be apparent from the following detailed description and the appended claims and drawings in which:

FIG. 1 is a block diagram of an existing carry chain;

FIG. 2 is a block diagram of another existing carry chain;

DETAILED DESCRIPTION OF THE PREFERRED EMBODIMENTS

Figure 3:
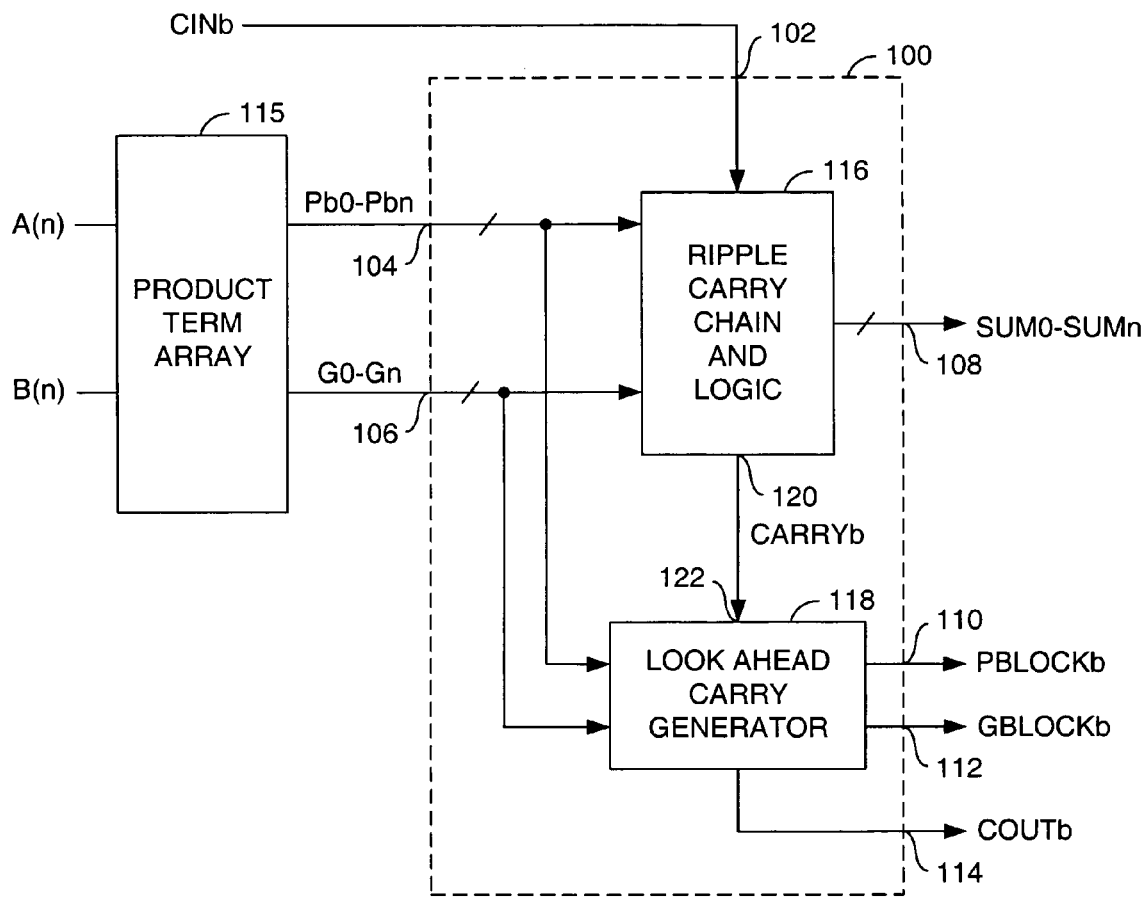
FIG. 3 is a block diagram of the present invention.

Referring to FIG. 3, a block diagram of a circuit 100 is shown illustrating a preferred embodiment of the present invention. The circuit 100 may be implemented as a programmable logic block or cluster of an integrated circuit. In one example, the circuit 100 may be implemented as a logic block of a programmable logic device (e.g., CPLD, FPGA, ASIC, etc.). The circuit 100 may comprise a circuit 116 and a circuit 118. The circuit 116 may be implemented, in one example, as a ripple carry chain and logic circuit. In one example, the circuit 116 may be implemented across a number of macrocells of a programmable logic block. The circuit 118 may be implemented as a lookahead carry generator for the logic block. Alternatively, the logic block may comprise a number of clusters, where each cluster comprises a circuit 116 and a circuit 118.

The circuit 118 may achieve a faster Cin-to-Cout path by flattening out the carry generation logic across multiple operand bits. For example, the carry-out ($c_{i+1}$) of a full adder (with single bit operands $a_i$, $b_i$ and carry-in $c_i$) may be expressed as a function of a single-bit propagate ($p_i$) signal and a single-bit generate ($g_i$) signal:

$$p_i = a_i + b_i$$

$$g_i = a_i b_i$$

$$c_{i+1} = g_i + p_i c_i$$

For example, the carry-out of a 4-bit lookahead generator may be expressed by the following equation:

$$C_{out} = C_{i+4} = g_{i+3} + p_{i+3} c_{i+3}$$

$$= g_{i+3} + p_{i+3}(g_{i+2} + p_{i+2}(g_{i+1} + p_{i+1}(g_i + p_i c_i)))$$

$$= g_{[i,i+3]} + p_{[i,i+3]} c_i$$

where:

$$p_{[i,i+3]} = p_i p_{i+1} p_{i+2} p_{i+3}$$

$$g_{[i,i+3]} = g_{i+3} + g_{i+2} p_{i+3} + g_{i+1} p_{i+2} p_{i+3} + g_i p_{i+1} p_{i+2} p_{i+3}$$

The signals $p_{[i,i+3]}$ and $g_{[i,i+3]}$ are generally referred to as a block carry-propagate signal and a block carry-generate signal, respectively. The carry-out of the block (Cout) may be computed purely from the propagate and generate signals ($P_i$ and $G_i$) and the initial carry input to the block (Cin). Any ripple delay from Cin to Cout may be reduced or eliminated. For clarity, the above example illustrated a block size of 4 bits. However, block carry-propagate, block carry-generate and block carry-out signals may be implemented spanning any number of bits. Given multiple blocks of N-bit adders and N-bit lookahead carry generators, fast adders of width M×N (where M=1, 2, 3 . . . ) may be synthesized either by (a) daisy-chaining blocks together such that each block carry-out drives the next block carry-in, or (b) cascading blocks in a tree-like fashion to perform multi-level carry lookahead.

The circuit 100 may have an input 102 that may receive an inverted carry input signal (e.g., CINb), an input 104 that may receive one or more inverted carry-propagate product term signals (e.g., Pb0–Pbn), an input 106 that may receive one or more carry-generate product term signals (e.g., G0–Gn), an output 108 that may present one or more sum bits (e.g., SUM0–SUMn), an output 110 that may present a signal (e.g., PBLOCKb), an output 112 that may present a signal (e.g., GBLOCKb), and an output 114 that may present a signal (e.g., COUTb). The signals Pb0–Pbn and G0–Gn may be generated in response to input signals (e.g., A(n) and B(n)) by a product-term array 115 associated with the circuit 100. The signals CINb, Pb0–Pbn, PCLOCKb, GCLOCKb, and COUTb may be implemented, in one example, as active low signals. The signal PBLOCKb may be implemented as an inverted block carry-propagate signal. The signal GBLOCKb may be implemented as an inverted block carry-generate signal. The signal COUTb may be implemented as an inverted block carry-out signal. The circuit 100 may be configured to generate the signals SUM0–SUMn, PBLOCKb, GBLOCKb, and COUTb in response to the signals CINb, Pb0–Pbn and G0–Gn. The circuit 100 may be configured to generate the sum or difference and a carry-out 10' of two numbers using inverted carry-propagate terms, inverted carry-generate terms and inverted carry terms.

The signals CINb, Pb0–Pbn and G0–Gn may be presented to inputs of the circuit 116. The circuit 116 may be configured to generate the signals SUM0–SUMn in response to the signals CINb, Pb0–Pbn and G0–Gn. The circuit 116 may have an output 120 that may present a signal (e.g., CARRYb) to an input 122 of the circuit 118.

The signal CARRYb may be an inverted carry signal. The circuit 118 may be configured to generate the signals PBLOCKb, GBLOCKb and COUTb in response to the signals Pb0–Pbn, G0–Gn and CARRYb.

When the circuit 100 is implemented as part of a programmable logic device (PLD), the signals SUM0–SUMn, PBLOCKb, and GBLOCKb may be presented to routing channels of the PLD. In one example, the signals may be coupled to the routing channels by an interface circuit or output permute circuit (block). The signal COUTb may be presented directly to an adjacent programmable logic block via a dedicated routing track. The signal CARRYb may be coupled to the circuit 118 via a dedicated routing track.

Figure 4:
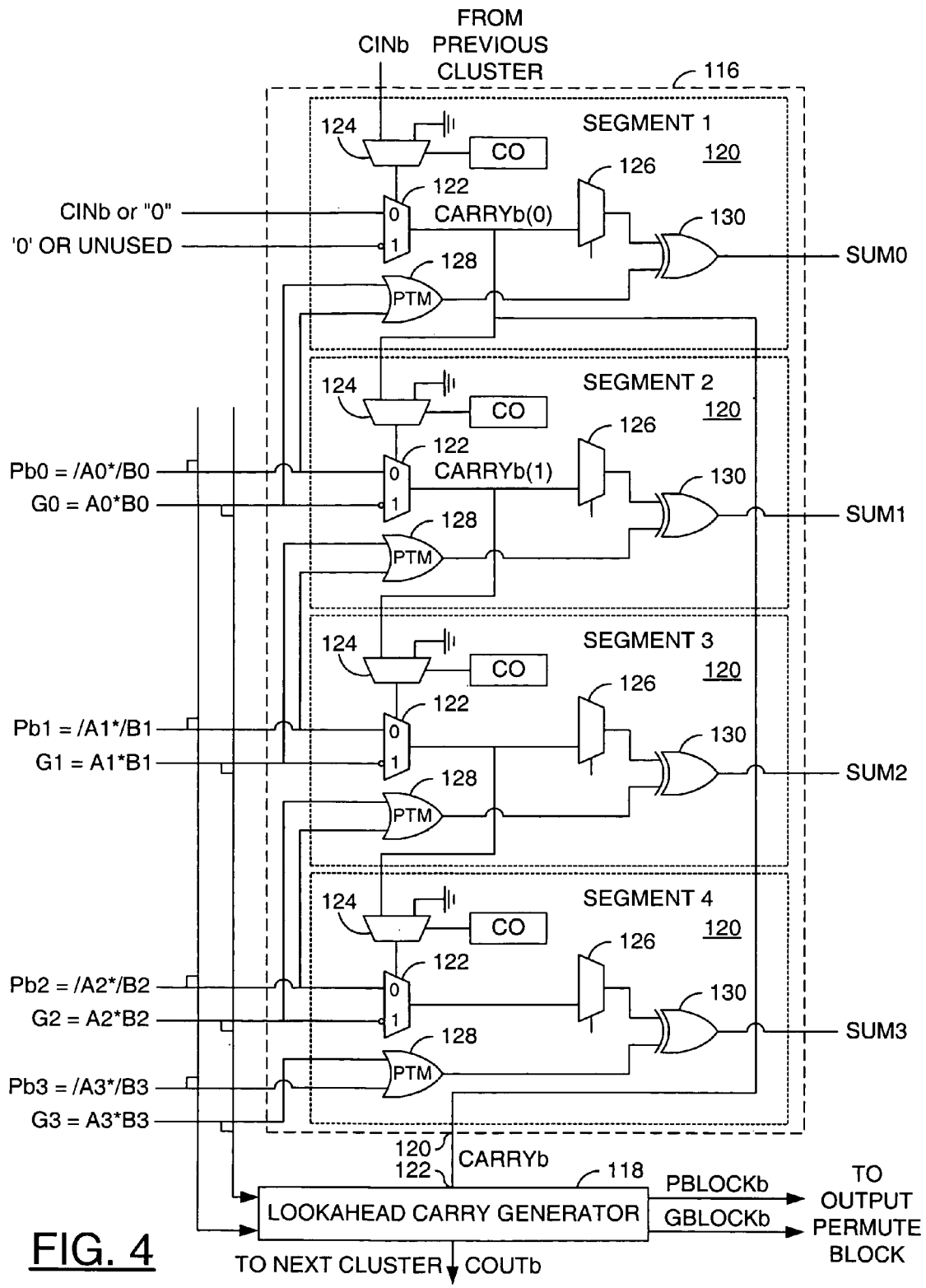
FIG. 4 is a more detailed block diagram of a preferred embodiment of the present invention.

Referring to FIG. 4, a more detailed block diagram of the circuit 116 is shown. The circuit 116 may be implemented using a number of macrocells 120 of a logic block (cluster). In one example, the circuit 116 may comprise four macrocells (segments) 120. However, other numbers of macrocells may be implemented accordingly to meet the design criteria of a particular application. Each of the macrocells 120 may have a ripple-chain segment or logic configured to generate and propagate an inverted carry signal. In one example, the logic may comprise a 2:1 carry generator multiplexer 122 that may have a non-inverting input and an inverting input. However, other logic may be implemented accordingly to meet the design criteria of a particular application.

The first (topmost) ripple-chain segment may receive an active-low (inverted) carry-in signal (e.g., CINb). The signal CINb may be an external carry-in signal, a carry signal from another logic block, or a carry signal from another cluster of the same logic block. In one example, the signal CINb may be routed to the select line of the carry generator multiplexer 122. Alternatively, the signal CINb may be presented to a decoupling multiplexer 124 controlled by a configuration bit. A state of the configuration bit may determine whether the signal CINb or a constant (e.g., a ground supply voltage VSS) is used. The carry ripple chain path may be a critical path of a design. By directly coupling the segments without a carry decoupler circuit 124, the speed of the carry ripple path may be increased to improve performance.

The carry generator multiplexer 122 in a first macrocell of a logic block (or cluster) generally receives 1 or 2 product terms from the product-term array 115. When the decoupling multiplexer 124 drives the signal CINb, the carry generator multiplexer 122 generally receives a constant from the product-term array 115 on both of the inputs. When the decoupling multiplexer 124 drives a constant or is not implemented, the carry generator multiplexer 122 may receive the signal CINb from the product-term array 115. In one example, the signal CINb may be received at the noninverting input, and the inverting input may be unused. The output of the first-segment carry generator multiplexer 122 (e.g., the signal CARRYb(0)), may be coupled as an input to (a) an XOR input multiplexer 126 for the current macrocell 120, (b) the carry decoupling multiplexer 124 or select input of the multiplexer 122 for the next carry chain segment, and (c) the circuit 118 as the signal CARRYb.

For each subsequent ripple-chain segment in the circuit 100, the decoupling multiplexer 124 or the multiplexer 122 may be configured to receive an inverted carry signal (e.g., CARRYb(i−1)) from the previous segment. When a carry decoupler is implemented, a configuration bit may determine whether the decoupling multiplexer 124 connects the signal CARRY(i−1) or a constant to the select line of the carry generator multiplexer 122 of the subsequent segments.

The carry generator multiplexer 122 generally receives 2 product terms directly from the product-term array 115: an inverted carry-propagate signal (e.g., Pb(i−1)=Ab(i−1)*Bb(i−1)) and a carry-generate signal (e.g., G(i−1)=A(i−1)*B(i−1)). When the carry generator multiplexer is implemented with an inverting input and a non-inverting input, the signal Pb(i−1) is generally connected to the noninverting input of the carry generator multiplexer 122, and the signal G(i−1) is generally connected to the inverting input of the carry generator multiplexer 122. The signals Pb(i−1) and G(i−1) may also be presented directly to the circuit 118 and to a product term matrix (OR-array) 128 of the logic block 100. An output of the carry generator multiplexer 122 may present a signal (e.g., CARRYb(i)). The signal CARRYb(i) may be an inverted carry signal. The signal CARRYb(i) may be coupled to (a) an XOR input multiplexer 126 for the current macrocell 120 and (b) the next carry chain segment. The last carry bit in the block 100 (e.g., the signal CARRYb(3)) is generally not propagated to a "next" segment. Instead, the signal COUTb from the circuit 118 may be presented to the "next" segment in the next cluster or block.

The circuit 118 generally receives as inputs the signal CARRYb generated in the first carry chain segment of a particular cluster (e.g., CARRYb(0)), the inverted carry-propagate product terms from the product-term array 115 (e.g., Pb0, Pb1, Pb2, Pb3, etc.), and the carry-generate product terms from the product-term array 115 (e.g., G0, G1, G2, G3, etc.). The last product term signals (e.g., Pb3 and G3 in the 4-bit example) are generally not connected to a carry generator multiplexer 122 in the ripple-chain, but are routed directly from the product-term array 115 to the OR-array 128 and the circuit 118. The circuit 118 may be configured to drive the block (cluster) carry-out signal COUTb to the next block (cluster) in the carry chain. In one example, the signal COUTb may be driven to the next block (cluster) via a dedicated routing track.

The circuit 118 may also provide the block-propagate signal PBLOCKb and the block-generate signal GBLOCKb to the routing tracks of the device. In one example, the signals PBLOCKb and GBLOCKb may be presented to an output permute block (not shown) of the circuit 100. The output permute block may be configured to select the signal PBLOCKb and/or the signal GBLOCKb to drive general-purpose routing tracks in the programmable logic device.

The carry chain of the present invention may be configured to operate as follows. The first segment of the chain may select between the signal CINb delivered by the previous cluster and a user-specified signal CINb. The selected signal is generally used to produce a first inverted carry term (e.g., CARRYb(0)), in the ripple chain. Each subsequent inverted carry term (e.g., CARRYb(1), CARRYb(2), CARRYb(3), etc.) may be generated in a respective segment (macrocell) by selecting between the inverted carry-propagate and carry-generate product terms (e.g., Pb(i), G(i)) based on the value of the inverted carry of the previous segment. Decoupling multiplexers 124 may be used, in one example, to allow the ripple-carry path between any two adjacent segments to be broken.

In a preferred embodiment, negative-carry logic is generally employed throughout the ripple-chain structure and the carry-select term is generally active low. When each carry-select term is active-low, the carry-propagate (Pb) and carry-generate (G) terms may be presented to each carry generator multiplexer 122 at inputs that are swapped when compared to existing carry chains (illustrated in FIGS. 1 and 2). The logic equation at the $i^{th}$ multiplexer output (e.g., CARRYb(i)) may be summarized as in the following equation:

$$\begin{aligned}
\text{CARRY}b(i) &= /(/\text{Carry}(i-1))*/P(i-1) + /\text{Carry}(i-1)*/G(i-1) \\
&= \text{Carry}(i-1)*(/A(i-1)*/B(i-1) + /\text{Carry}(i-1)* \\
&\quad /(A(i-1)*B(i-1)) \\
&= /A(i-1)*/B(i-1)*\text{Carry}(i-1) + /(A/i-1)* \\
&\quad /\text{Carry}(i-1) + /B(i-1)*/\text{Carry}(i-1) \\
&= /((A(i-1) + B(i-1) + /\text{Carry}(i-1))*(A(i-1) + \\
&\quad \text{Carry}(i-1))*(B(i-1) + \text{Carry}(i-1))) \\
&= /(A(i-1)*B(i-1) + A(i-1)*\text{Carry}(i-1) + \\
&\quad B(i-1)*\text{Carry}(i-1) + A(i-1)*B(i-1)* \\
&\quad \text{Carry}(i-1) + A(i-1)*B(i-1)*/\text{Carry}(i-1)) \\
&= /(A(i-1)*B(i-1) + A(i-1)*\text{Carry}(i-1) + \\
&\quad B(i-1)*\text{Carry}(i-1)) \\
&= /\text{Carry}(i)
\end{aligned}$$

To generate the $i^{th}$ sum bit, the logic equation Sum(i)=A(i) XOR B(i) XOR Carry(i) may be synthesized at the macrocell input. The logic equation may be synthesized by selecting the inverted carry-propagate and the carry-generate product terms (Pb(i) and G(i)) to drive the OR-array 128 and the XOR-gate 130 of each macrocell. The product terms Pb(i) and G(i) may have already been created in the product-term array 115 to generate the (i+1)th carry in the carry chain. Since these product terms are also available to the OR-array 128, the function Pb(i)+G(i) may be presented to a first input of the XOR gate 130. A second input of the XOR gate 130 generally receives the signal CARRYb(i) via the XOR input multiplexer 126. The resulting logic equation at the macrocell input may be expressed by the following equation:

$$\begin{aligned}
\text{Sum}(i) &= (/P(i) + G(i)) \text{ XOR } /\text{Carry}(i) \\
&= (/A(i)*/B(i) + A(i)*B(i)) \text{ XOR } /\text{Carry}(i) \\
&= /(A(i) \text{ XOR } B(i)) \text{ XOR } /\text{Carry}(i)
\end{aligned}$$

By the inequality property of the XOR-function, the above logic equation may be rewritten as:

$$\text{Sum}(i) = A(i) \text{ XOR } B(i) \text{ XOR } \text{Carry}(i)$$

By employing a negative carry polarity, the present invention may facilitate generating a sum output directly from the carry-propagate and carry-generate product terms. Both the sum and carry logic for an adder may be implemented using an average of 2 unique product terms per macrocell (not including constants).

In one example, the carry chain of the circuit 100 may generate and propagate carry terms across the macrocells of the block and produce the sum at the macrocell outputs. The carry-forward to the next block may be computed in parallel by the circuit 118, independently of the ripple path.

Figure 5:
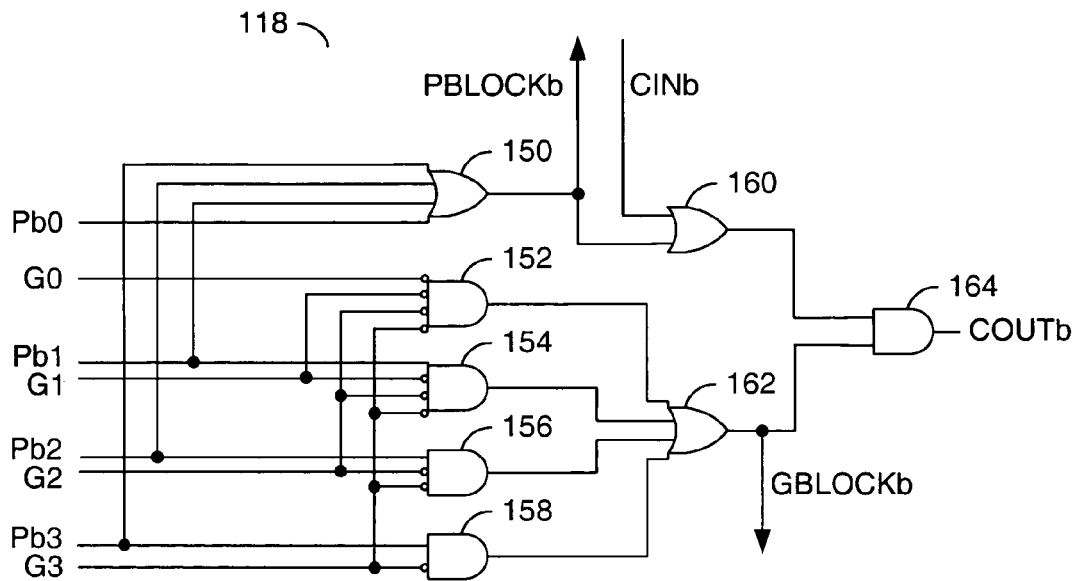
FIG. 5 is a block diagram of a lookahead carry generator of FIG. 4.

Referring to FIG. 5, a block diagram illustrating a preferred embodiment of the circuit 118 is shown. The circuit 118 may comprise a gate 150, a gate 152, a gate 154, a gate 156, a gate 158, a gate 160, a gate 162 and a gate 164. The gate 150 may be implemented, in one example, as a four input OR gate. The gate 152 may be implemented, in one example, as an AND gate having four inverting inputs. The gate 154 may be implemented, in one example, as an AND gate having one non-inverting input and three inverting inputs. The gate 156 may be implemented, in one example, as a three input AND gate having one non-inverting input and two inverting inputs. The gate 158 may be implemented, in one example, as a two input AND gate having an inverting input and a non-inverting input. The gate 160 may be implemented, in one example, as a two input OR gate. The gate 162 may be implemented, in one example, as a four input OR gate. The gate 164 may be implemented, in one example, as a two input AND gate. However, other types of gates may be implemented accordingly to meet the design criteria of a particular application.

The signal Pb0 may be presented to a first input of the gate 150. The signal Pb1 may be presented to a second input of the gate 150 and the non-inverting input of the gate 154. The signal Pb2 may be presented to a third input of the gate 150 and the non-inverting input of the gate 156. The signal Pb3 may be presented to a fourth input of the gate 150 and the non-inverting input of the gate 158. The signal G0 may be presented to a first input of the gate 152. The signal G1 may be presented to a second input of the gate 152 and a first inverting input of the gate 154. The signal G2 may be presented to a third input of the gate 152, a second inverting input of the gate 154 and a first inverting input of the gate 156. The signal G3 may be presented to a fourth input of the gate 152, a third inverting input of the gate 154, a second inverting input of the gate 156 and the inverting input of the gate 158.

The signal PBLOCKb may be presented at an output of the gate 150. The output of the gate 150 may be connected to a first input of the gate 160. The signal CINb may be presented to a second input of the gate 160. An output of each of the gates 152, 154, 156 and 158 may be presented to a respective input of the gate 162. The signal GBLOCKb may be presented at an output of the gate 162. An output of the gate 160 may be presented to a first input of the gate 164. The output of the gate 162 may be connected to a second input of the gate 164. The signal COUTb may be presented at an output of the gate 164.

Based on the example of 4 inverted carry-propagate and 4 inverted carry-generate product terms, an inverted block carry-propagate signal and an inverted block carry generate signal may be produced as illustrated by the following equations:

$$/P_{block} = /P0 + /P1 + /P2 + /P3$$

$$/G_{block} = /G0*/G1*/G2*/G3 + /P1*/G1*/G2*/G3 + /P2*/G2*/G3 + /P3*/G3$$

The inverted block carry-out signal COUTb to the next block or cluster (e.g., the carry-in signal CARRYb(3) for the $4^{th}$ sum bit) may be expressed by the following equation:

$$\begin{aligned}
\text{COUT}b &= /G_{block} * (/P_{block} + /\text{Carry}(0)) \\
&= /G_{block} * (/P_{block} + /Cin)
\end{aligned}$$

The above equations may be scaled to fit the number of product terms used in a particular application. The negative carry polarity may be preserved from one block or cluster to the next.

The circuit 118 may be implemented as a custom circuit. In general the circuit 118 may be optimized at the transistor level to reduce the carry propagation delay even further.

Figure 6:
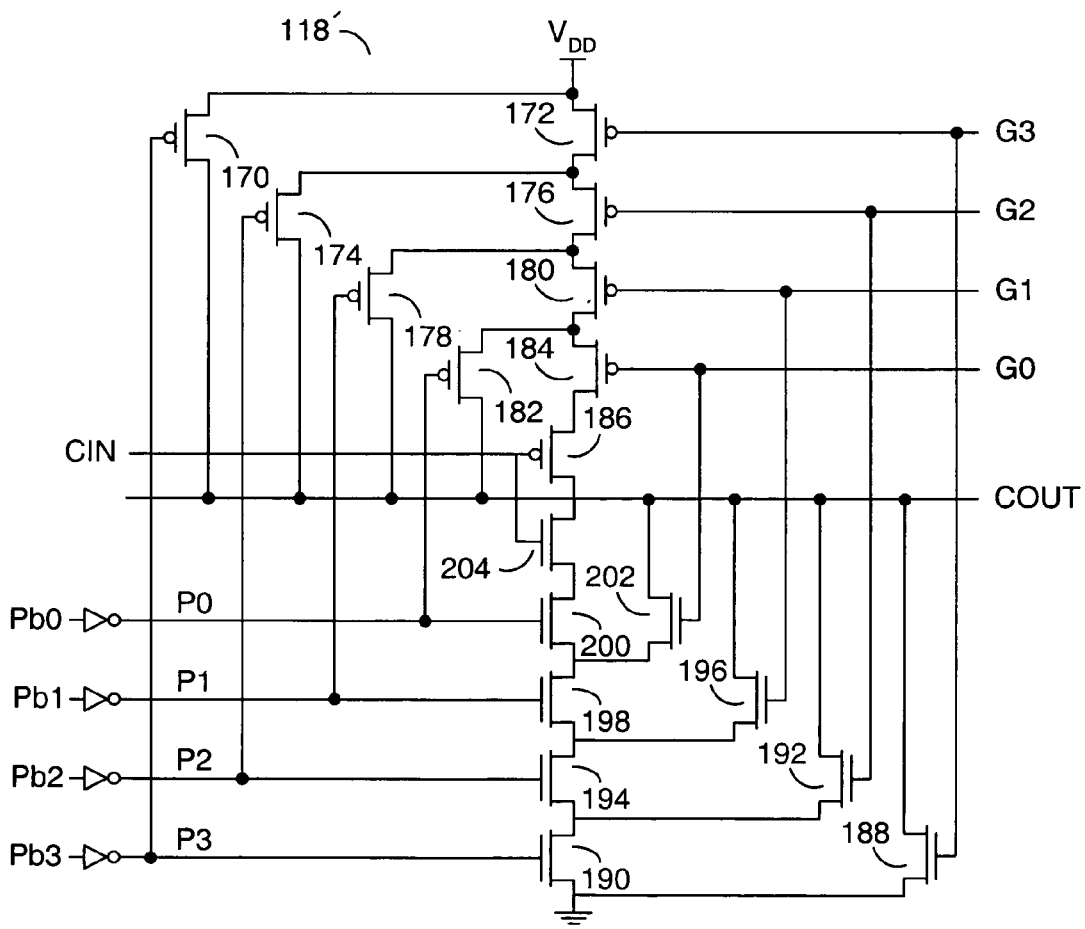
FIG. 6 is schematic diagram of an optimized CMOS implementation of a 4-bit carry generator.

Referring to FIG. 6, a schematic diagram of a circuit 118' is shown illustrating an optimized CMOS implementation of a 4-bit carry generator, using positive carry-logic. The circuit 118' may be implemented using a 4-bit lookahead adder as described in J. Rabaey, "DIGITAL INTEGRATED CIRCUITS: A DESIGN PERSPECTIVE," Prentice Hall, 1996, page 405, which is hereby incorporated by reference in its entirety. The circuit 118' may comprise a number of PMOS transistors 170–186 and a number of NMOS transistors 188 204. The signals P0–P3 may be generated by inverting the signals Pb0–Pb3.

The CMOS implementation of the 4-bit carry generator generally uses only 18 transistors. The carry generator circuit 118' may be implemented using very little silicon area. The delay path from CIN to COUT generally contains only a single inverter with a series of pass transistors to each rail. The circuit 118' may provide extremely fast critical path performance. The 4-bit implementation is illustrated for clarity. However, the 4-bit example may be scaled for other bit widths.

Figure 7:
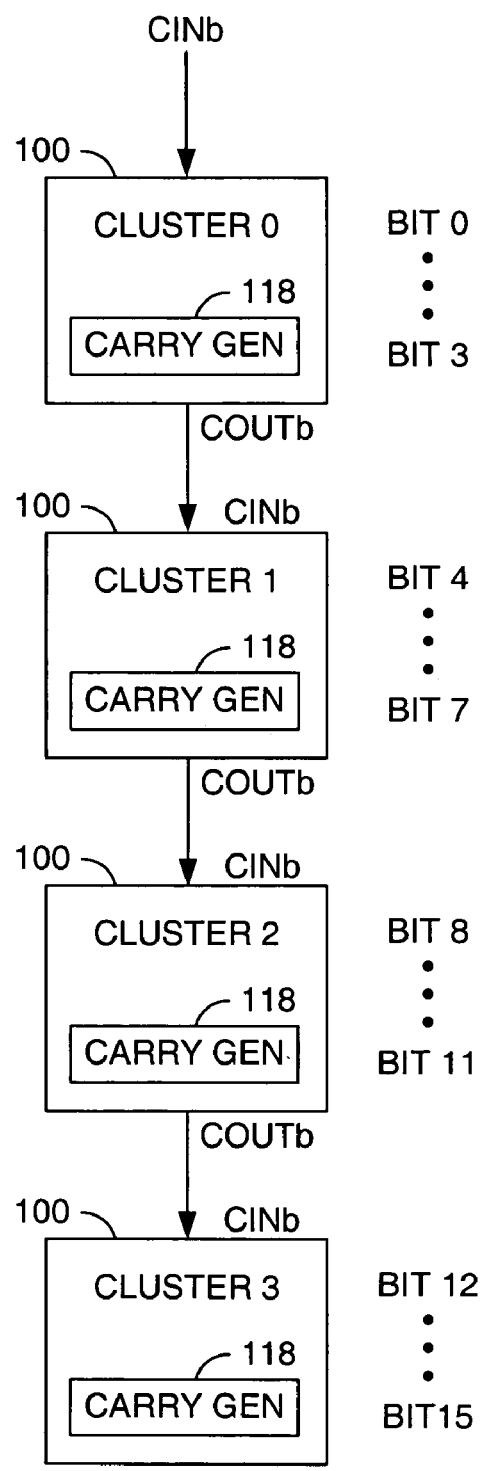
FIG. 7 is a block diagram of a single-stage implementation of a n-bit adder in accordance with the present invention.

Referring to FIG. 7, a block diagram of a 16-bit adder 210 is shown in accordance with a preferred embodiment of the present invention. Fast arithmetic functions with bit widths greater than a single logic block or cluster may be implemented by cascading multiple blocks or clusters. Multiple blocks or clusters may be daisy-chained such that the carry-in to the $i^{th}$ cluster is delivered by the circuit 118 of the (i−1)th cluster. When the clusters are daisy-chained, the block carry-propagate and block carry-generate signals are generally not used outside the cluster in which they are created. A particular implementation of the carry generator circuit 118 may (i) choose not to create the block carry-propagate and block carry-generate signals as outputs and (ii) use the present invention in a pure multi-bit ripple mode alone. In the full implementation of the present invention, the daisy-chain method may occupy a minimal area (e.g., only as many clusters as there are 4-bit slices in the adder) and may be sufficiently fast since each lookahead carry generator generally bypasses the bit-to-bit ripple delay within the cluster. The width and/or number of clusters may be varied to meet the design criteria of a particular application.

Figure 8:
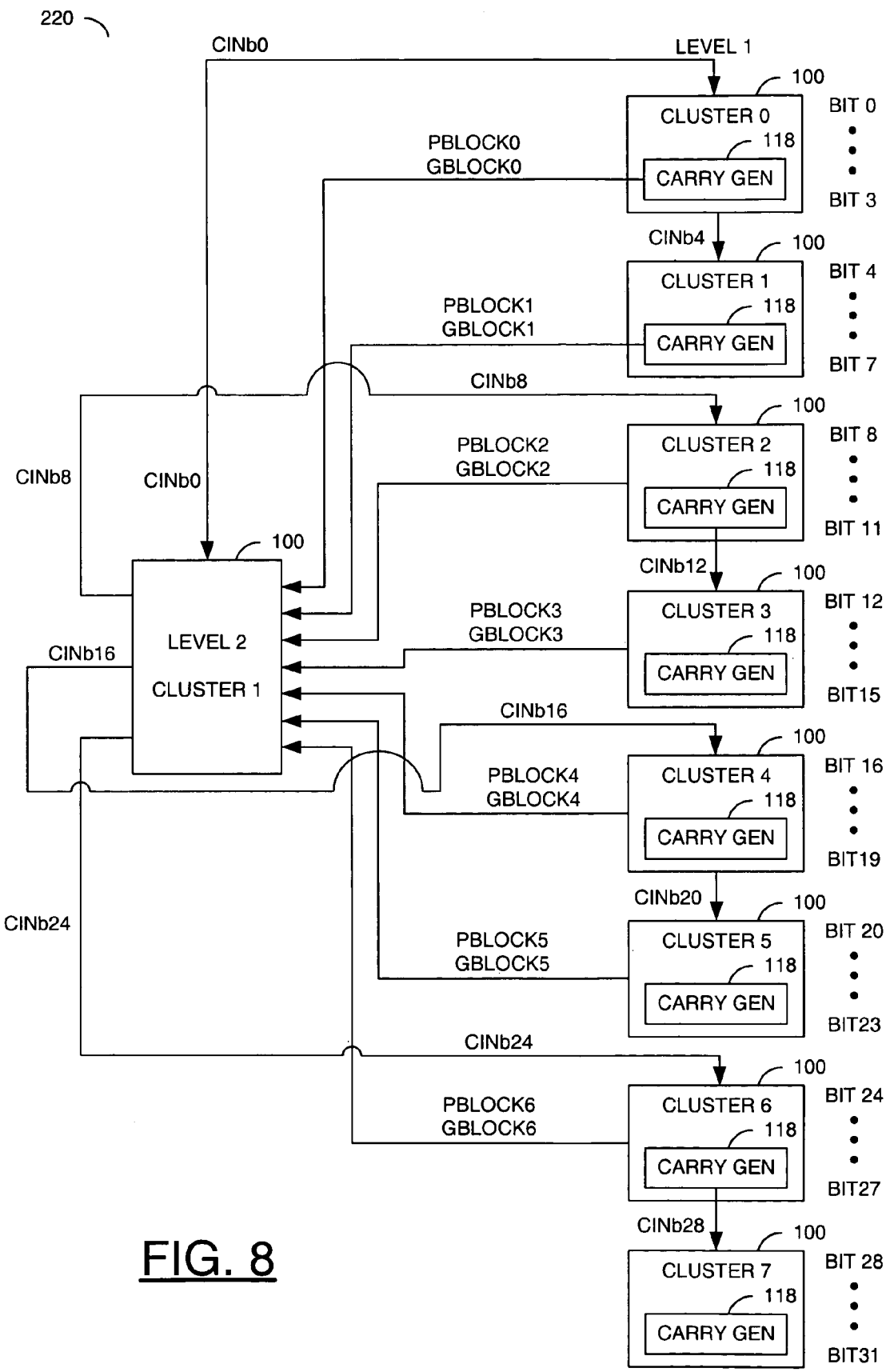
FIG. 8 is a block diagram of a multi-stage implementation of an n-bit adder in accordance with the present invention.

Referring to FIG. 8, an example of a 32-bit adder 220 implemented using a multi-level embodiment of the present invention is shown. The logic blocks 100 may be cascaded to achieve a multi-level carry lookahead scheme. The block carry-propagate and block carry-generate signals from a block in a first stage (level) are generally routed as inputs to a block in a second stage (level). The second stage is generally configured to logically combine the block carry-propagate and block carry-generate signals in the AND-OR planes to form anticipated carry-in signals (e.g., CINb8, CINb16, CINb24, etc.) for, in one example, bits 8, 16, and 24 of the 32-bit adder. The computation of the anticipated carry-in signals may be illustrated by the following equations:

$$/Cin_8 = /G_{4-7}(/P_{4-7} + /Cin_4)$$

$$= /G_{4-7}(/P_{4-7} + /G_{0-3}(/P_{0-3} + /Cin_0))$$

$$/Cin_{16} = /G_{12-15}(/P_{12-15} + /G_{8-11}(/P_{8-11} + /G_{4-7}(/P_{4-7} +$$

$$/G_{0-3}(/P_{0-3} + /Cin_0))))$$

$$/Cin_{24} = /G_{20-23}(/P_{20-23} + /G_{16-19}(/P_{16-19} + /G_{12-15}(/P_{12-15} +$$

$$/G_{8-11}(/P_{8-11} + /G_{4-7}(/P_{4-7} + /G_{0-3}(/P_{0-3} +$$

$$/Cin_0))))))$$

The carry outputs from the second stage block or cluster 100 are generally routed to the inputs of the corresponding first stage blocks or clusters 100. The carry outputs are generally coupled as the signal CINb to each local carry chain. The carry-in terms for bits 4, 12, 20, and 28 of the adder may be rippled from the lookahead-carry generator 118 in a preceding first stage cluster. In one example, when the logic blocks are implemented with 4 macrocells, the first stage clusters may perform a 4-bit carry lookahead across each 8-bit slice of the adder, while the second stage cluster generally performs in parallel an 8-bit carry lookahead on up to all 32 bits of the adder.

The second level of parallel carry computation may enable faster operation of the adder, while using slightly more area than the configuration of FIG. 7. The concept may be extended to perform multiple levels of carry lookahead up to 4n bits, where n=1, 2, 3, etc.) The present invention may provide very fast, parallelized implementations of wide arithmetic functions. More than two levels may be implemented to meet the design criteria of a particular application.

Figure 9:
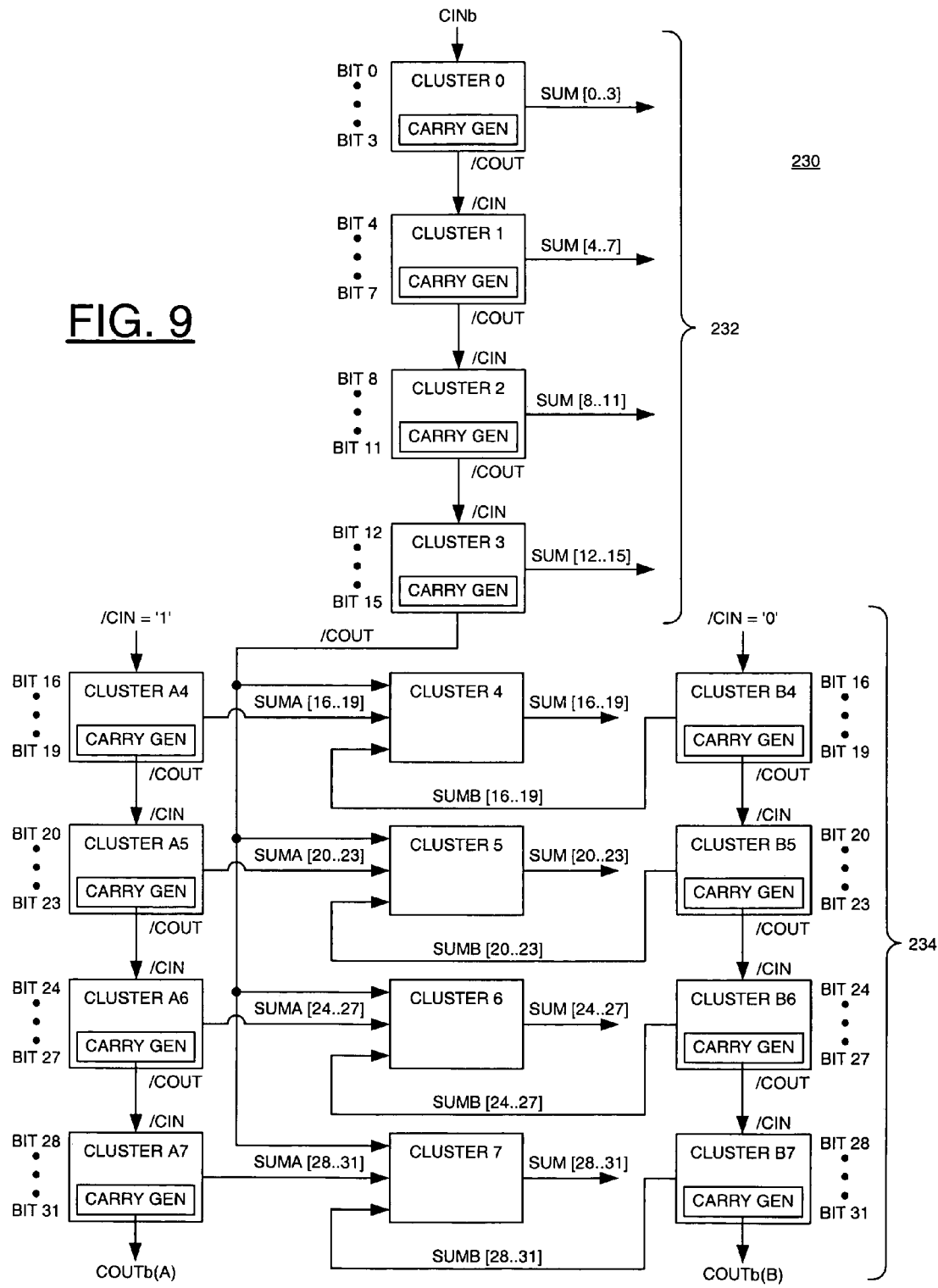
FIG. 9 is a block diagram of a carry-select implementation of an n-bit adder in accordance with the present invention.

Referring to FIG. 9, a block diagram of a circuit 230 illustrating an example carry-select scheme in accordance with the present invention is shown. A wide adder (e.g., having bit widths greater than a single logic block or cluster) may be split into multiple ripple-chain slices. A carry-select scheme may be implemented to generate the final result from the slices. The circuit 230 may be implemented, in one example, as a 32-bit adder.

A lower-order (least significant) slice (e.g., a circuit portion 232) may be implemented by daisy-chaining together multiple logic clusters (e.g., clusters 0–3) to produce the lower-order sum bits and an intermediate lookahead carry-out signal. When the carry-select scheme is implemented, the block-propagate and block-generate outputs of the clusters are generally not used and may be omitted.

The higher-order bits of the adder may be generated using two separate arrays of clusters, each configured in a ripple-chain (e.g., a circuit portion 234). A first array (e.g., clusters A4–A7) may be configured to receive an initial carry-in of '1'. The second array (e.g., clusters B4–B7) may be configured to receive an initial carry-in of '0'. Each array generally produces a unique set of higher-order sum and carry-out bits based on the presumed carry-in of one or zero, respectively. Both of the higher-order ripple-chains generally produce a respective sum or difference and a carry-out in parallel with the lower-order adder slice. The parallelization of the higher-order sum/carry logic generally reduces the overall propagation delay of the adder.

The higher-order sums or differences from the two arrays are generally routed to a fourth set of logic blocks or clusters (e.g., clusters 4–7), where each i-th pair of higher-order sum bits may be multiplexed together based on the value of the intermediate carry-out from the lower-order adder slice. The multiplexing logic may be implemented in the AND-OR plane(s) of clusters 4–7 to produce the final higher-order sum or difference bits. An additional cluster may be used to multiplex the carry-out of the adder from the two lookahead carry-out signals of the higher-order ripple-chains (not shown).

By implementing a carry-select scheme in accordance with the present invention, the propagation delay of a wide adder may be significantly reduced compared to a simple ripple-chain of clusters. By the time the lower-order adder slice generates the intermediate carry-out, the higher-order ripple-chains may have already produced two sets of sum and carry-out results based on either possible value of the intermediate carry-out. When the intermediate carry-out becomes valid, all the appropriate higher-order sum bits are generally selected in parallel.

The present invention may provide an improved carry chain architecture for very fast and efficient implementations of arithmetic functions in a product-term based programmable logic device (PLD). However, the present invention may also be implemented with other types of programmable logic devices. The present invention may reduce the number of product terms consumed by the carry chain, without introducing extra logic elements or additional delay in the macrocell datapath. The present invention may incorporate a dedicated lookahead-carry generator that may deliver the anticipated carry-out across all macrocells of a logic cluster to an adjacent cluster. Generation of the lookahead carry may provide improved speed performance compared to conventional ripple-carry chains.

The delay of the n-bit carry-lookahead adder implemented in accordance with the present invention is generally on the order of $\log_n k$, where n is the number of bits in a cluster and K is the width of the adder. Incorporating a lookahead scheme into the PLD carry chain may optimize the critical path of the adder.

The present invention may provide flexibility of implementation in a programmable logic architecture. For example, the present invention may be implemented using negative or positive carry logic. The logic may be constructed to produce an inverted carry-out (e.g., COUTb) from an inverted carry-in (e.g., CINb) as shown in FIG. 5. The DeMorgan complement of the logic may be employed to produce a non-inverted carry-out (e.g., COUT) from a non-inverted carry-in (e.g., CIN). Alternatively, an implementation may chose to not produce the block carry-propagate and block carry-generate signals from a block, and use the present invention in the multi-bit ripple mode (as shown in FIG. 7). Both the partial implementation described above and the full implementation of the present invention may allow for the multi-bit ripple mode to conserve area.

The full implementation of the present invention may allow any combination of a multi-bit ripple mode and a full-scale multi-level carry lookahead, while consuming slightly more area than in the pure multi-bit ripple mode. The present invention may give the user the ability to select an area-optimized or speed-optimized implementation in a software-configurable manner.

The block propagate, generate, and carry-out signals may be scaled to span any size of the logic block or cluster. When the logic block size is large (many macrocells), the block may be divided into multiple clusters and configured to produce multiple block carry-propagate and block carry-generate signals for each cluster. A block may thus deliver one or more sets of block propagate and block generate outputs. However, in general, there is only one carry-out generated for the entire logic block.

Alternatively, when the block size is large, only one set of block-propagate and block-generate signals may be produced for the entire block. However, the block may be designed circuit-wise in multiple stages using the equations shown above.

There are several advantages of the proposed invention over the existing methods. First, compared to the carry chain architecture in FIG. 1, the number of product terms for implementing sum and carry logic may be reduced from 4 to 2 per macrocell, ignoring constants. The reduced number of product terms may allow greater flexibility in defining the number of product terms per macrocell in a PLD logic cluster. With the present invention, a cluster may allocate only 2 to 3 product terms per macrocell and thereby achieve better overall area and delay performance for the device.

Moreover, the reduction in product term consumption may be achieved without introducing additional logic or configuration elements into the macrocell architecture. Compared with the circuit of FIG. 2, the present invention may eliminate or reduce the number of NOR-gates, multiplexers, and configuration bits in each macrocell. The reduction may amount to a savings in area and bitstream complexity. The savings may be significant considering that a high-density PLD may contain tens of thousands (or more) of macrocells. Furthermore, by eliminating the multiplexer in the macrocells of FIG. 2 that selects between the NOR-output (sum equation) and the AND-OR output equation, the delay in the macrocell datapath may be decreased. Decreasing the delay in the macrocell data path may be important since the macrocell is generally part of the critical path when implementing any generic logic function.

A significant benefit of the present invention may be raw performance. The present invention may be capable of very fast and flexible implementations of arithmetic functions, particularly when the function is very wide. While the worst-case propagation delay of the ripple-based carry chains as shown in FIG. 1 and FIG. 2 are of order N (where N=width of the function), the present invention may achieve a worst-case delay of order $\log_m N$, where m=number of segments in a cluster. The present invention may implement (a) faster adder circuits using a multi-bit ripple mode instead of single-bit ripple mode, or (b) much faster adder circuits using true carry-lookahead or carry-select. The increased speed performance may come at a very small area cost per cluster, since the lookahead-carry logic is generally entirely custom and can be optimized at the transistor level. Implementing a carry-lookahead adder in programmable AND-OR logic, while possible, generally results in dramatically large area consumption and less-than-ideal speed performance. The present invention may provide better critical path performance for arithmetic-based designs than any existing method. The present invention may offer considerable flexibility to the user in selecting an area-optimized or speed-optimized implementation of arithmetic functions. A carry-select or multi-level carry-lookahead implementation may be selected when speed performance is most critical, and a daisy-chained implementation may be selected when minimum area consumption is desired.

The present invention may have a number of alternate embodiments. The first segment of the carry chain in each cluster may employ an X:1 (X=2, 3, 4 . . . ) carry generator multiplexer with all data inputs as noninverting. The select line of the first carry generator multiplexer may be driven directly by one or more configuration bits instead of a decoupling multiplexer. A first input of the carry generator multiplexer may be connected to a product-term from the product-term array to provide a user-defined inverted carry-in signal. A second input of the carry generator multiplexer may be connected to the dedicated inverted carry-in input to the cluster, that may be provided by the previous cluster. Additional dedicated inverted carry-in inputs from adjacent logic blocks or clusters or constant logic levels may be routed to any remaining inputs of the carry generator multiplexer. A DeMorgan complement of the lookahead carry generator logic in a cluster may be implemented to produce an active-high carry-out from an active-high carry-in.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation.

While the invention has been particularly shown and described with reference to the preferred embodiments thereof, it will be understood by those skilled in the art that various changes in form and details may be made without departing from the spirit and scope of the invention.

What is claimed is:

1. A programmable logic block in an integrated circuit comprising:
   a plurality of macrocells comprising logic configured to (i) generate and propagate an inverted carry-input signal and (ii) generate a sum bit;
   an AND-array comprising at least two product terms per macrocell;
   an OR-array configured to generate a sum-of-products term for each macrocell in response to said two product terms; and
   a logic circuit configured to (a) receive (i) said product terms and (ii) the carry-input signal generated by a first macrocell of said plurality of macrocells and (b) generate (i) a block carry-propagate signal, (ii) a block carry-generate signal, and (iii) a block carry-output signal, wherein said logic in said macrocells comprises (i) a carry generator configured to select a first product term or a second product term as said inverted carry-input signal and (ii) a second logic circuit configured to logically combine said inverted carry-input signal and said sum-of-products term to generate said sum bit.

2. The programmable logic block according to claim 1, wherein said carry generator is configured to receive an inverted carry-propagate product term at a non-inverting input and a carry-generate product term at an inverting input.

3. The programmable logic block according to claim 1, wherein the carry generator comprises a multiplexer of size x:1, wherein x is at least equal to 2 and wherein a select line of said multiplexer is coupled to either an output of a carry decoupler, a user configurable input, a constant logic level, a carry-input signal from another macrocell of said programmable logic block, or a carry-input signal from another programmable logic block of said integrated circuit.

4. The programmable logic block according to claim 3, wherein the carry decoupler is configured to select either the carry-input signal from another macrocell, the carry-input signal from another programmable logic block or the constant logic level in response to the user configurable input.

5. The programmable logic block according to claim 3, wherein the carry decoupler comprises a multiplexer having a user configurable select line.

6. The programmable logic block according to claim 1, wherein:
   said AND-array is configured to generate (i) an inverted carry-propagate product term and (ii) a carry-generate product term for each macrocell in response to input terms to said logic block; and
   said OR-array is configured to generate an inverted partial sum or difference bit for each macrocell in response to (i) said inverted carry-propagate product term and (ii) said carry-generate product term.

7. The programmable logic block according to claim 1, wherein said plurality of macrocells are coupled to form a ripple-carry chain.

8. The programmable logic block according to claim 1, wherein said logic circuit comprises one or more logic gates configured to generate said block carry-propagate signal in response to a plurality of carry-propagate product terms.

9. The programmable logic block according to claim 8, wherein said logic circuit is further configured to generate said block carry-generate signal in response to a logical combination of said carry-generate product terms and one or more of said carry-propagate product terms.

10. The programmable logic block according to claim 1, wherein said logic circuit is configured to generate said block carry-out signal in response to a logical combination of (i) said block carry-propagate signal, (ii) said block carry-generate signal, and (iii) said inverted carry-input signal.

11. A method for computing a sum or difference and a carry-out in a programmable logic block comprising the steps of:
   (A) logically combining one or more inverted carry-propagate terms with one or more carry-generate terms to generate one or more inverted partial sums or differences;
   (B) logically combining each of said one or more inverted partial sums or differences with a respective inverted carry-in to generate said sum or difference, wherein the step (B) comprises the sub-step of selecting either a user configured carry-in, a predetermined carry-in, a constant, a second inverted carry-propagate term or a complement of a second carry-generate term as said inverted carry-in; and
   (C) logically combining said one or more inverted carry-propagate terms, said one or more carry-generate terms, and a first one of said respective inverted carry-ins to generate a block carry-out.

12. The method according to claim 11, wherein the step (C) comprises the sub-step of:
   propagating said first inverted carry-in to a carry lookahead generator; and
   logically combining said inverted carry-in with said one or more inverted carry-propagate terms and said one or more carry-generate terms to generate (i) a block carry-propagate signal, (ii) a block carry-generate signal and (iii) said block carry-out.

13. The method according to claim 11, wherein the step (A) is performed in an OR-array of said programmable logic block.

14. The method according to claim 11, wherein the step (B) comprises the sub-step of:
   performing a logical Exclusive-OR or Exclusive-NOR of each of said one or more inverted partial sums or differences with a respective inverted carry-in.

15. The method according to claim 11, wherein the step (B) further comprises the sub-step of: decoupling a macrocell from a ripple-chain in response to a user configurable input.

16. An N-bit adder/subtractor comprising:
- a ripple carry chain across N macrocells, each macrocell comprising logic configured to (i) generate and propagate an inverted carry-input signal and (ii) generate a sum bit;
- an AND-array configured to generate an inverted carry-propagate product term and a carry-generate product term for each macrocell;
- an OR-array configured to generate an inverted partial sum bit for each macrocell in response to each pair of said inverted carry-propagate product terms and said carry-generate product terms; and
- a logic circuit configured to generate a block carry-output signal in response to (i) said N inverted carry-propagate product terms, (ii) said N carry-generate product terms, and (iii) a least significant one of said inverted carry-input signals, wherein each of said N macrocells comprises (i) a carry generator configured to select a first product term or a complement of a second product term as said inverted carry-input signal and (ii) a second logic circuit configured to logically combine said inverted carry-input signal with said inverted partial sum bit to generate said sum bit.

17. The N-bit adder/subtractor according to claim 16, wherein a first one of said N macrocells is configured to receive an external carry-input signal and said block carry-output signal is presented as a carry result of said N-bit adder/subtractor.

* * * * *